United States Patent
Brockel et al.

(10) Patent No.: US 10,201,126 B2
(45) Date of Patent: Feb. 12, 2019

(54) COMBINE HARVESTER WITH ELEVATOR

(71) Applicant: CNH Industrial America LLC, New Holland, PA (US)

(72) Inventors: Tyler Brockel, Le Claire, IA (US); William Cooksey, Geneseo, IL (US); Jason Coppinger, Davenport, IA (US); Craig Murray, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/141,022

(22) Filed: Apr. 28, 2016

(65) Prior Publication Data

US 2016/0316627 A1    Nov. 3, 2016

Related U.S. Application Data

(60) Provisional application No. 62/155,112, filed on Apr. 30, 2015.

(51) Int. Cl.
| | | |
|---|---|---|
| *A01F 12/60* | (2006.01) | |
| *A01D 61/00* | (2006.01) | |
| *A01F 12/46* | (2006.01) | |
| *A01F 12/44* | (2006.01) | |

(52) U.S. Cl.
CPC ............ *A01D 61/00* (2013.01); *A01F 12/444* (2013.01); *A01F 12/446* (2013.01); *A01F 12/46* (2013.01)

(58) Field of Classification Search
CPC . A01F 12/46; A01D 41/1208; A01D 41/1217; A01D 41/12; B65G 33/32; B65G 33/00; B65G 65/46
See application file for complete search history.

(56) References Cited

U.S. PATENT DOCUMENTS

| | | | |
|---|---|---|---|
| 786,991 A | | 4/1905 | Podlesak |
| 1,382,901 A | * | 6/1921 | Gebhardt ................ A01F 12/52 209/257 |
| 3,580,257 A | * | 5/1971 | Teague ............... A01D 41/1208 460/1 |
| 3,760,813 A | * | 9/1973 | Mathews ............... A01D 41/02 460/119 |
| 4,067,343 A | * | 1/1978 | Muijs ..................... A01D 41/12 198/642 |
| 4,645,055 A | * | 2/1987 | Griese .................. B65G 11/166 138/110 |

(Continued)

*Primary Examiner* — Arpad Fabian-Kovacs

(74) *Attorney, Agent, or Firm* — Peter K. Zacharias; Patrick M. Sheldrake

(57) ABSTRACT

An agricultural harvester includes a chassis, at least one ground engaging traction member connected to the chassis, a cleaning system held by the chassis and configured to clean crop material, and an elevator supplied with the crop material. The elevator includes a housing having a crop material inlet that receives the crop material, a boot portion that forms a bottom of the housing, and a plurality of paddles configured to convey the crop material through the housing and away from the boot portion in a generally vertical direction. The elevator further includes a hinged wall section that includes a flexible steel sheet and a UHMW material plastic or other durable wear resistant flexible material overlying the sheet and facing an interior of the elevator. The hinged wall section may be a boot door or a head door.

17 Claims, 5 Drawing Sheets

(56) References Cited

U.S. PATENT DOCUMENTS

| | | | |
|---|---|---|---|
| 4,800,902 A * | 1/1989 | Maust | A01D 41/1208 460/114 |
| 4,924,664 A | 5/1990 | Hicks et al. | |
| 5,380,247 A * | 1/1995 | Underwood | A01D 41/1208 460/114 |
| 5,443,352 A * | 8/1995 | Schuhmacher | A01D 41/1208 198/550.01 |
| 5,496,215 A * | 3/1996 | Underwood | A01D 41/1208 460/114 |
| 5,498,206 A * | 3/1996 | Underwood | A01F 12/52 460/119 |
| 5,788,055 A * | 8/1998 | Stewart | B65G 33/32 198/670 |
| 5,863,247 A * | 1/1999 | Behnke | G01G 11/00 460/114 |
| 5,884,466 A | 3/1999 | Willmering et al. | |
| 6,053,811 A | 4/2000 | Johnson et al. | |
| 6,059,094 A | 5/2000 | Swanstrom et al. | |
| 6,102,795 A * | 8/2000 | Behrens | A01D 41/1208 414/502 |
| 6,350,197 B1 * | 2/2002 | Cooksey | A01F 12/46 460/114 |
| 6,358,143 B1 * | 3/2002 | Hurlburt | A01D 41/1217 414/502 |
| 6,367,234 B1 * | 4/2002 | Hurlburt | A01D 41/1208 460/114 |
| 6,669,558 B1 * | 12/2003 | Wolters | A01F 12/52 460/114 |
| 6,974,384 B2 * | 12/2005 | Schmidt | A01F 12/52 460/114 |
| 7,028,457 B2 * | 4/2006 | Schmidt | A01F 12/52 460/114 |
| 7,544,128 B2 | 6/2009 | Van Vooren et al. | |
| 7,833,091 B2 * | 11/2010 | Holtmann | A01D 41/12 460/114 |
| 8,007,353 B1 * | 8/2011 | Werning | A01F 12/46 460/13 |
| 8,801,514 B1 * | 8/2014 | McCully | A01F 12/46 198/801 |
| 8,858,310 B2 | 10/2014 | Cooksey et al. | |
| 9,410,840 B2 | 8/2016 | Acheson et al. | |
| 2010/0300846 A1 * | 12/2010 | Marchesini | B65G 33/32 198/671 |
| 2014/0329572 A1 | 11/2014 | McCully et al. | |

\* cited by examiner

COMBINE HARVESTER WITH ELEVATOR

CROSS REFERENCE TO RELATED APPLICATION

This application claims the benefit of U.S. Provisional Patent Application No. 62/155,112, entitled "Combine Harvester with Elevator" and filed Apr. 30, 2015, the contents of which are incorporated herein by reference.

FIELD OF THE INVENTION

The present invention relates to agricultural harvesters, and, more particularly, to agricultural harvesters with crop material elevators.

BACKGROUND OF THE INVENTION

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave, and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

The elevator in the agricultural harvester delivers the grain to the storage tank and is subject to constant wear imposed by the granular material, particularly in the areas of the elevator that change the flow direction. Two areas most affected are the boot door which is a curved section at the bottom of the elevator and the head door which is at the top of the elevator. Currently, these doors are hinged so as to permit access and service life removal. Because the crop material impinges on the surface of these doors, wear is an important consideration. As a result the doors are typically made of rolled, formed steel that has a thickness of around 3½ mm and is heat treated. While this addresses the issue of wear and service life, it does not solve the issue of the difficulty of fitting the curved door to preformed contours of the elevator sidewalls. Typically rolled steel is not able to totally match the contours of the side wall curved cut and any discrepancies can result in leakage which takes away from efficiency.

What is needed in the art is an agricultural harvester with improved elevator effectiveness, efficiency, and durability.

SUMMARY OF THE INVENTION

In accordance with an aspect of the present invention, there is provided an agricultural harvester with an elevator having a flexible wear material in curved portions.

In accordance with another aspect of the present invention, there is provided a wall section for a combine elevator having interior walls exposed to crop material. The wall section has an outer sheet of flexible steel secured to the walls of the elevator at least over a portion of the outer sheet's margins and a flexible ultra high molecular weight polyethylene (UHMW-PE) plastic material or other durable wear resistant flexible material overlying the face of the outer sheet facing the interior of the elevator.

In accordance with yet another aspect of the present invention, there is provided a crop material elevator including a housing having a crop material inlet, a boot portion forming a bottom of the housing, and a top. The crop material elevator further includes a grain inlet and a grain outlet. A driving loop held within the housing extends from the boot portion toward the top of the housing. A plurality of paddles is connected to the driving loop and is configured to convey crop material away from the boot portion toward the top of the housing. A wall section of the crop material elevator includes an outer sheet of flexible steel secured to walls of the elevator at least over a portion of the outer sheet's margins and a flexible UHMW-PE plastic material or other durable wear resistant flexible material overlying the face of the outer sheet facing the interior of the elevator.

In accordance with still another aspect of the present invention, there is provided an agricultural harvester including: a chassis; at least one ground engaging traction member connected to the chassis; a cleaning system held by the chassis and configured to clean crop material; and an elevator supplied with the crop material cleaned by the cleaning system. The elevator includes a housing having a crop material inlet that receives the crop material, a boot portion that forms a bottom of the housing, and a plurality of paddles configured to convey the crop material through the housing and away from the boot portion in a generally vertical direction. A wall section includes an outer sheet of flexible steel material secured to the elevator housing at least over a portion of the outer sheet's margin and a flexible UHMW-PE plastic material or other durable wear resistant flexible material overlying the face of the sheet facing the interior of the elevator.

An advantage of the wall section is that it can increase the durability of the elevator in the agricultural harvester.

Another advantage is that the elevator is more efficient.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
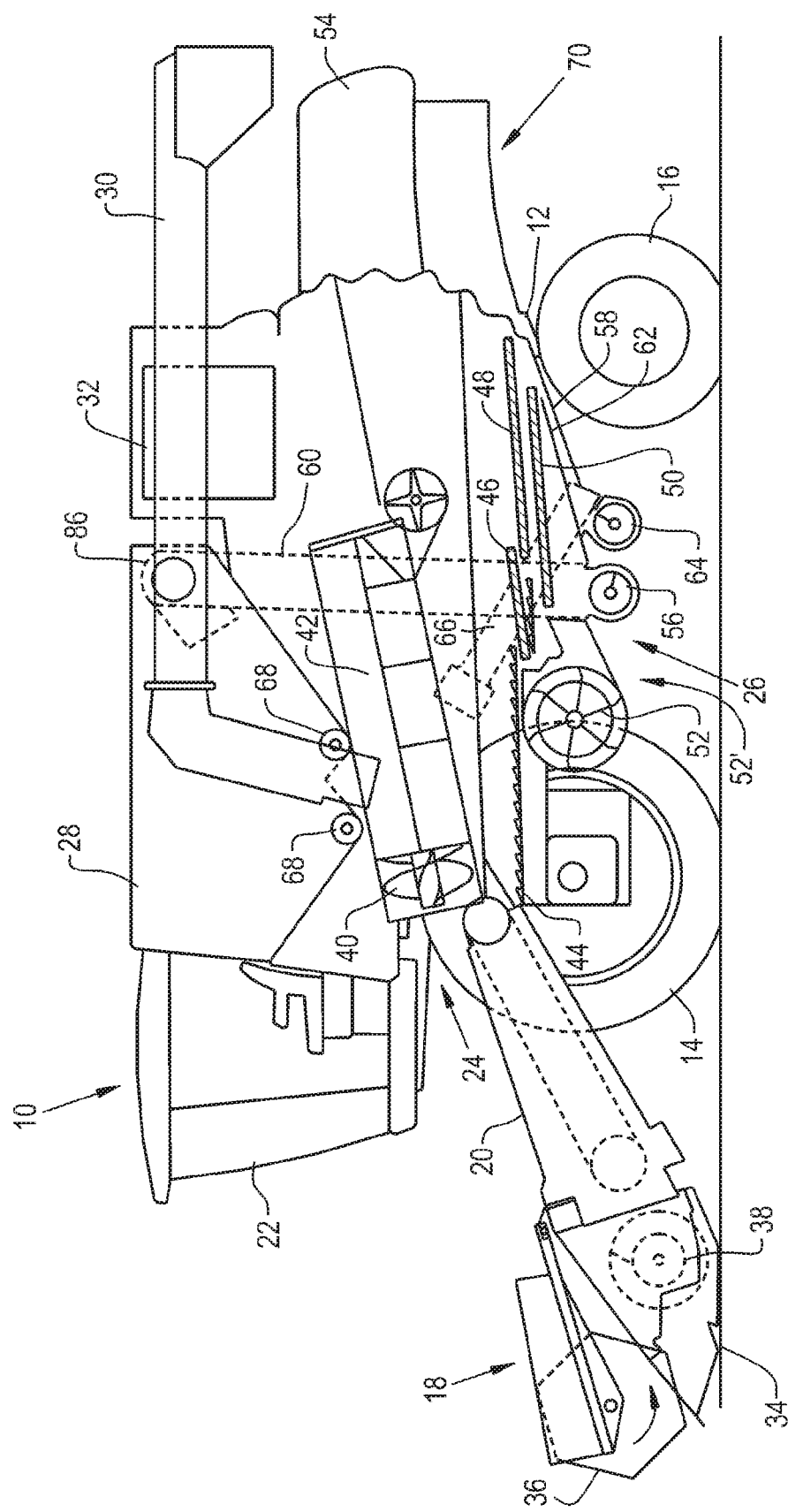
FIG. 1 is a perspective view of an embodiment of an agricultural harvester, in accordance with an exemplary embodiment of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30, in accordance with an exemplary embodiment of the present invention. It should be appreciated that while the agricultural harvester is shown as combine 10, the agricultural harvester according to the present invention can be any type of construction that allows for crop material to be harvested such as a conventional combine (which does not have a rotor), rotary combine, a hybrid combine, a chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves, and the like, are discharged from the rear of combine 10. Smaller elements of crop material including grain and non-grain crop material, including particles lighter than grain, such as chaff, dust, and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48, and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 62. The tailings are transported via tailings auger 64 and return auger 66 to the upstream end of cleaning system 26 for repeated cleaning action. Grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
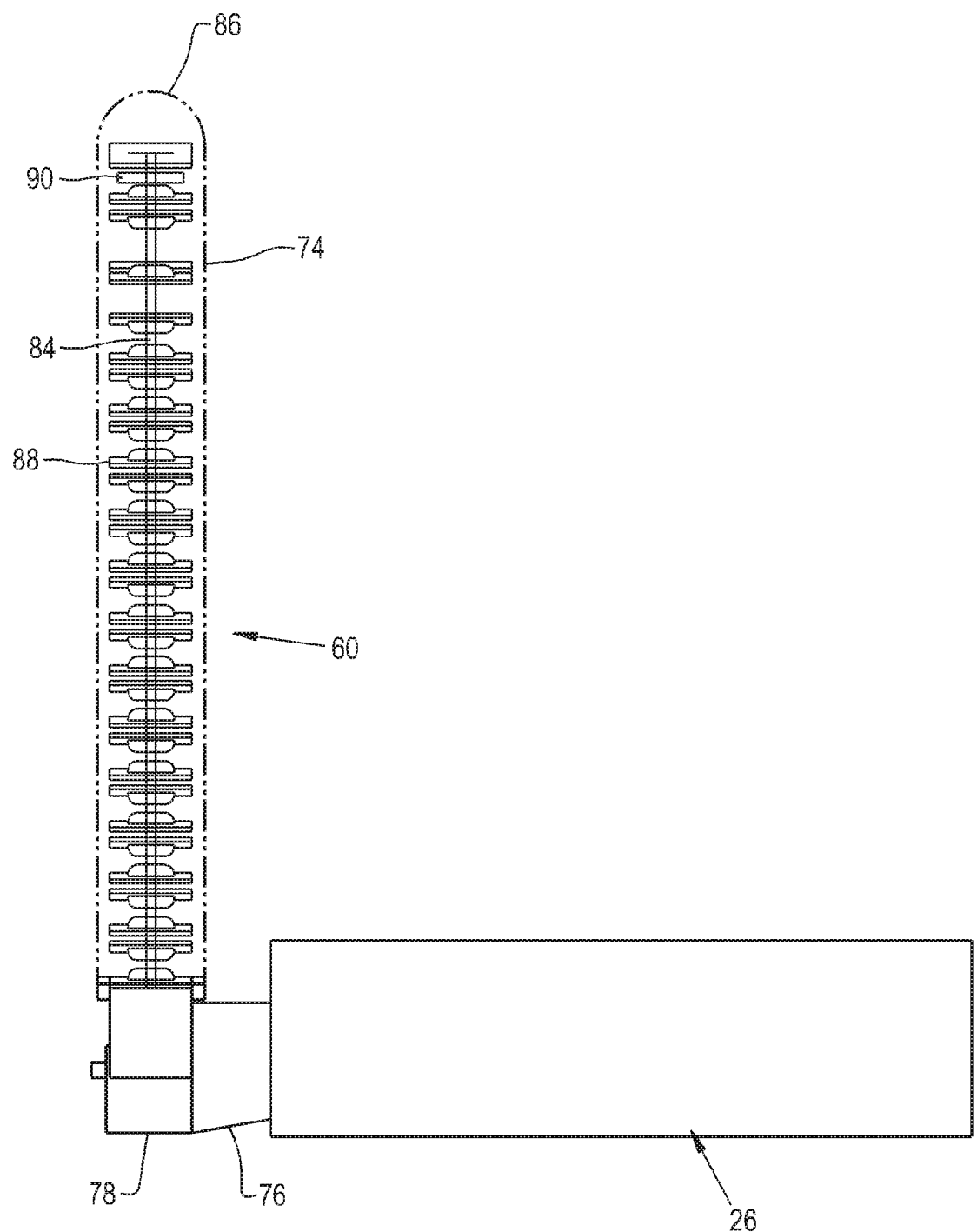
FIG. 2 is a cutaway perspective view of a portion of the agricultural harvester shown in FIG. 1, showing a portion of a cleaning system and elevator, in accordance with an exemplary embodiment of the present invention.

Referring now to FIG. 2, a portion of the agricultural harvester 10 with the cleaning system 26 and elevator 60 is shown in better detail, in accordance with an exemplary embodiment of the present invention. As can be seen, crop material is supplied to the elevator 60 through the cleaning system 26, which is shown generically as a block to illustrate that any sort and portion of a cleaning system could supply crop material to the elevator 60. When the cleaning system 26 shown in FIG. 1 supplies crop material to the elevator 60, the crop material can be supplied to the elevator 60 utilizing clean grain auger 56. It should be appreciated that the elevator 60 can be supplied with crop material from more than one auger or a mechanism besides an auger, depending on the configuration of the cleaning system.

Figure 3:
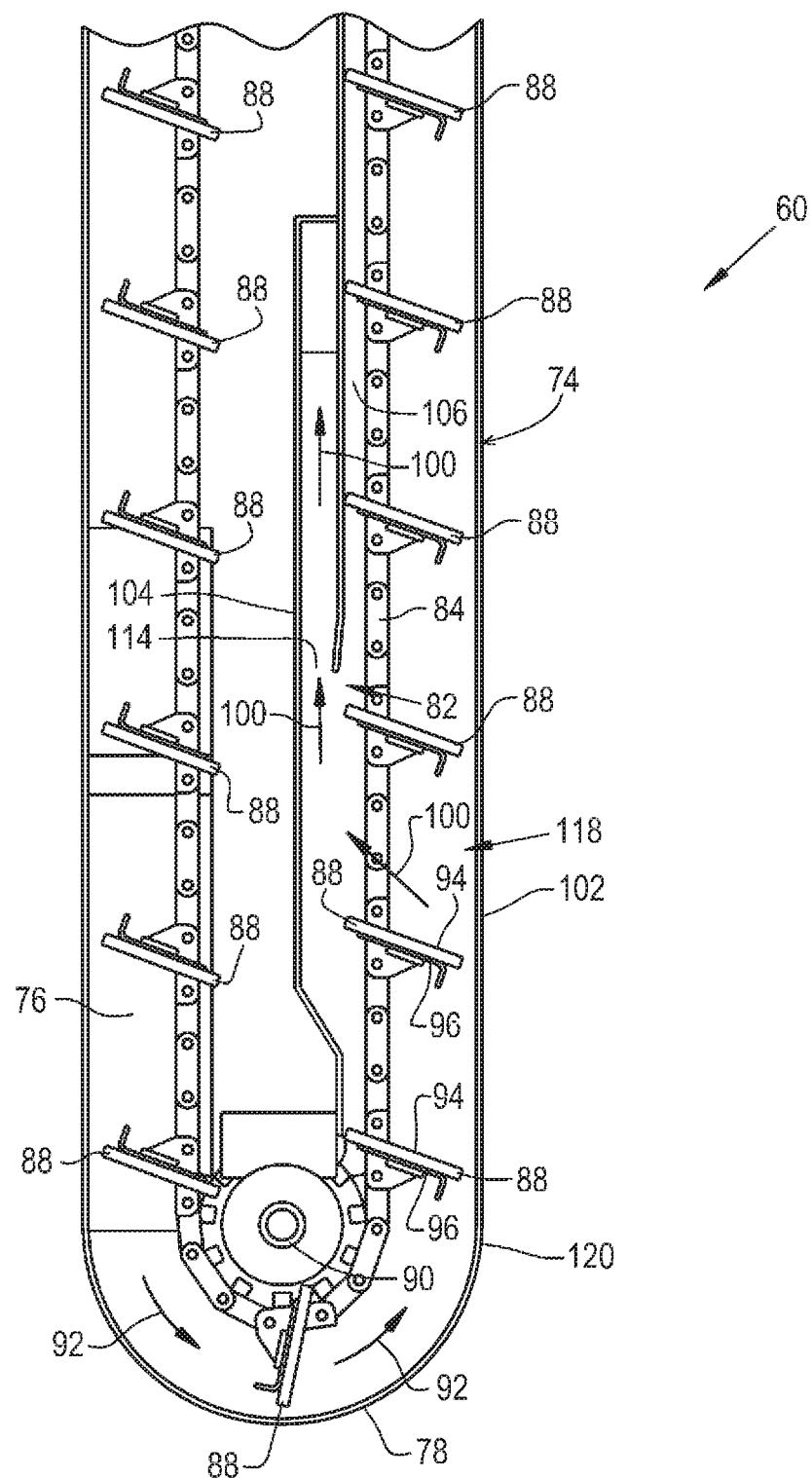
FIG. 3 is a sectional view of an embodiment of the elevator shown in FIG. 2, in accordance with an exemplary embodiment of the present invention.
Figure 4:
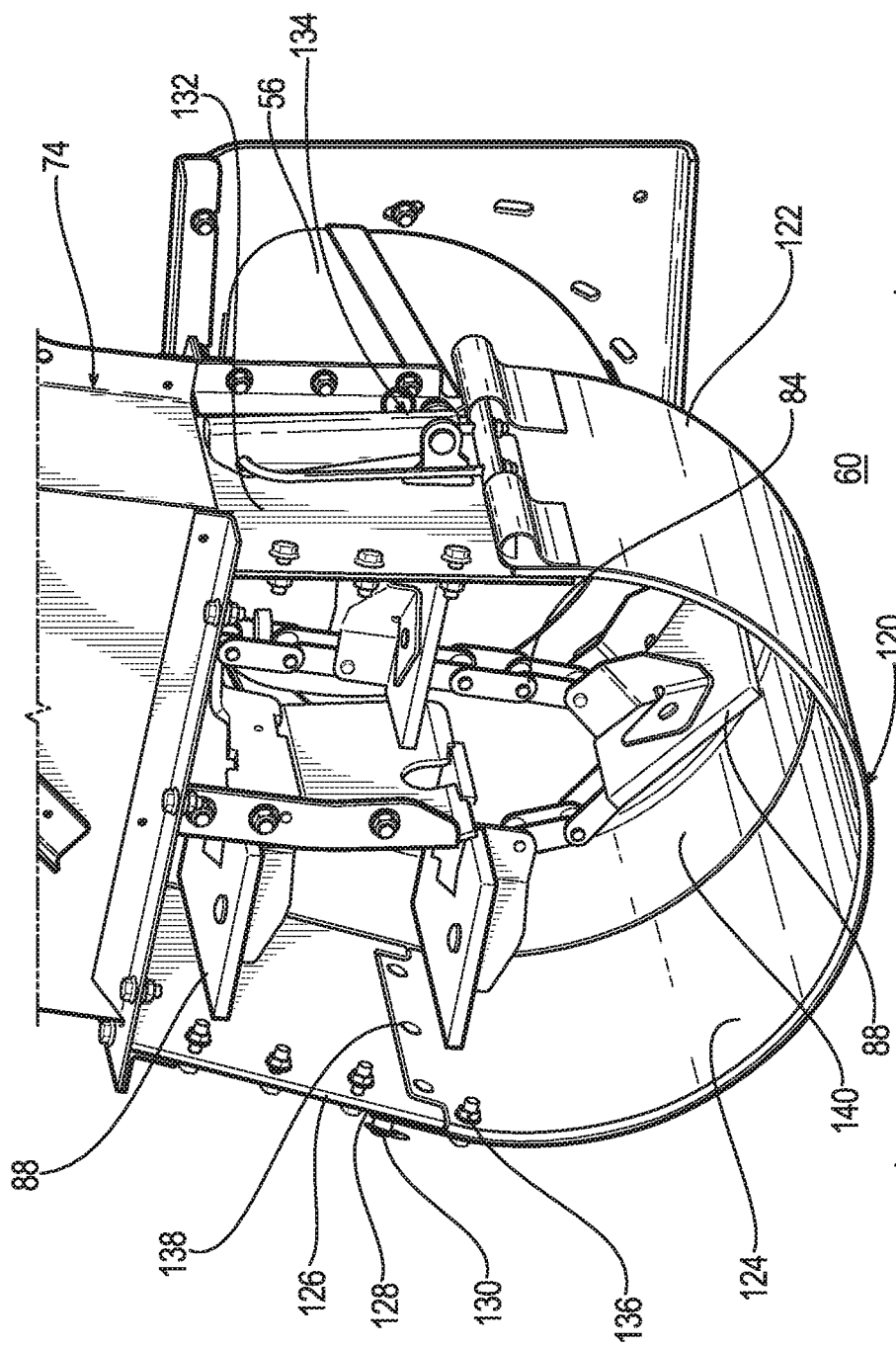
FIG. 4 is a cutaway perspective view of a boot door of the elevator shown in FIGS. 2-3, in accordance with an exemplary embodiment of the present invention.

Referring now to FIG. 3, the elevator 60 is shown in greater detail, in accordance with an exemplary embodiment of the present invention. As can be seen, the elevator 60 includes a housing 74 with a crop material inlet 76 supplied with clean grain from the cleaning system 26, and a boot portion 78 that forms a bottom of the housing 74. It should be understood that while clean grain is described as the crop material being transported through the elevator 60 when referencing FIGS. 3-5, other crop material such as tailings could also be transported through the elevator 60, or grain that is not acceptably clean due to high concentrations of MOG. It should also be understood that the elevator 60 can have any relative position to the cleaning system 26 that allows for crop material to be conveyed from the cleaning system 26 to the elevator 60. A driving loop 84, shown here as a drive chain, is held within the housing 74 and extends from the boot portion 78 of the housing 74 toward a top 86 (shown in FIGS. 1-2) of the housing 74. Although the driving loop 84 is shown as being a drive chain, which can also be referred to as an endless chain, the driving loop 84 could also be a belt, a cable, or other similar construction that forms a loop through the housing 74 and can be driven to rotate throughout the housing 74. Paddles 88 are connected to the driving loop 84, which can be driven by sprockets 90 to move the paddles 88 through the housing 74 along the driving loop 84 and convey clean grain from the crop material inlet 76 to the top 86 of the housing 74, where the crop material can be unloaded to the grain tank 28. As shown in FIG. 3, the paddles 88 rotate about the lower sprocket 90 in a counter-clockwise direction, indicated by arrow 92. In this sense, the paddles 88 each have a leading edge 94 which the crop material will rest on during vertical transport up the elevator 60 and a lagging edge 96 that is a bottom of the paddles 88. As shown in FIGS. 3-4, the housing 74 has a mostly rectangular cross-section, except for the boot portion 78 forming the bottom of the housing 74, which has a semi-circular shape. The boot portion 78 has a semi-circular shape to allow for paddles 88 to rotate about the sprocket 90 near the bottom of the housing 74 and transition from a vertical descent down the elevator 60 toward the boot portion 78 into a vertical ascent up the elevator 60 away from the boot portion 78 and toward the top 86 of the housing 74.

FIG. 4 shows a detail of the elevator boot section 78, in accordance with an exemplary embodiment of the present invention. An elevator boot door generally indicated at 120 includes an outer sheet of flexible steel 122. Sheet 122 is formed from steel that has a thickness of about 1.5 mm. Sheet 122 has a sheet 124 of ultra high molecular weight (UHMW-PE) plastic material overlying it on the wall facing the interior of the elevator 60. Material making up sheet 124 can be any one of a number of high molecular weight materials, for example high density polyethylene plastic. The sheet 122 is pivotally secured to a wall 126 of elevator 60 through a hinge section 128 and a removable pin 130. The opposite end of sheet 122 is connected to a wall 132 of elevator 60 through an over center latch mechanism indicated at 134.

The UHMW-PE material 124 is secured to sheet 122 by appropriate fasteners 136 and to the wall 126 of elevator 120 through flush fasteners 138. It should be noted that in FIG. 4 the movement of the paddles 88 is in a clockwise rotation whereas the orientation in FIG. 3 which is taken from the opposite side shows movement in a counterclockwise direction. The elevator boot door 120 wraps around a curved end wall 140 of the elevator 60 and because both the sheet 122 and the UHMW-PE material 124 are flexible, they will conform to whatever shape is presented by side wall 140. As a result, the gap between the two is essentially minimized if not eliminated.

By providing the UHMW-PE material 124 as the contact barrier between the crop material and the sheet 122, the service life can be greatly increased. The flexibility of the UHMW-PE material 124 allows it to have much greater wear resistance than an equivalent steel panel. By providing the flexibility in the sheets, disassembly for ultimate replacement of the UHMW-PE material 124 is greatly facilitated achieving not only high service life but efficient movement of crop material.

Figure 5:
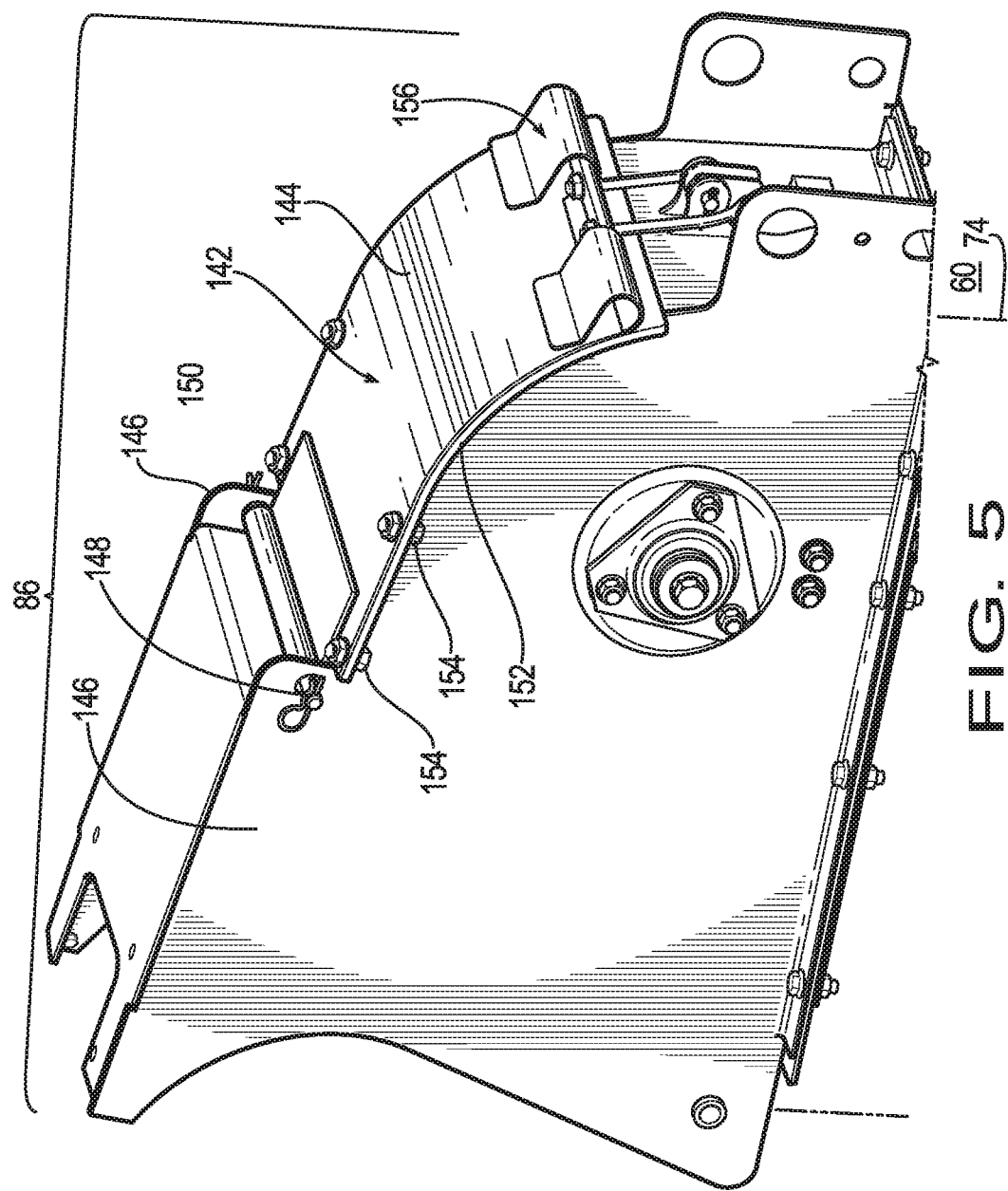
FIG. 5 is a perspective view of a head door of the elevator shown in FIGS. 2-3, in accordance with an exemplary embodiment of the present invention.

The same benefits applied to the boot door 120 shown in FIG. 4 can be applied to the upper end 86 shown on FIG. 5 having a head door generally indicated by 142, in accordance with an exemplary embodiment of the present invention. Head door 142 has an outer flexible steel sheet 144 that can conform to the curved edges of side walls 146. Sheet 144 is pivotally connected to the sidewalls 146 by a removable pin 148 retained within a bracket 150 affixed to sheet 144 by appropriate means. A UHMW-PE sheet is secured to sheet 144 by fasteners 154 located adjacent the pivot pin 148. The sheet 152 is formed from material similar to that for sheet 124 shown in FIG. 4. An over center latch 156 allows the head door 142 to be pivoted out for inspection and/or replacement of the UHMW-PE sheet 152. As in the case with the configuration shown in FIG. 4 the UHMW-PE sheet 152 and sheet 144 will flex to meet the contours of the side walls 146, thus providing an efficient sealing at the junction between the corresponding walls and the respective doors. The sheet 144 may be typically 1.5 mm steel and the UHMW material 152 is 4.78 mm although it can be found in a range of material thickness depending upon the application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wall section for a combine elevator having interior walls exposed to crop material, the wall section extending only over an area impacted by crop material comprising:
   an outer sheet of flexible steel having a thickness of approximately 1.5 mm for securing to at least one wall of the elevator over at least a portion of an edge of the outer sheet; and
   a flexible ultra high molecular weight (UHMW) plastic wear resistant flexible material having a thickness of approximately 4.78 mm overlying an inner face of the outer sheet and having an area not substantially greater than the area of said outer sheet, wherein the outer sheet is curved.

2. The wall section of claim 1, wherein the outer sheet is one of a boot door and a head door.

3. The wall section of claim 1, wherein the outer sheet is a head door.

4. The wall section of claim 1, further comprising a hinge connected to one edge of the outer sheet.

5. The wall section of claim 4, wherein the UHMW plastic wear resistant flexible material is secured to the outer sheet adjacent the hinge.

6. The wall section of claim 4, further comprising a removable latch connected to the outer sheet opposite to the hinge.

7. The wall section of claim 1, wherein the UHMW plastic a UHMW polyethylene flexible material.

8. A crop material elevator, comprising:
 a housing including a crop material inlet, a boot portion forming a bottom of the housing, and a top;
 a driving loop held within the housing that extends from the boot portion toward the top of the housing;
 a plurality of paddles connected to the driving loop and configured to convey crop material away from the boot portion toward the top of the housing;
 a first wall section; and
 a second wall section at least partially overlapping the first wall section, the second wall section comprising:
  an outer sheet of flexible steel secured to the housing at least over at least a portion of an edge of the outer sheet; and
  a flexible ultra high molecular weight (UHMW) plastic durable wear resistant flexible material overlying an inner face of the outer sheet and at least partially overlapping the first wall section and having an area not substantially greater than the area of said outer sheet,
  wherein the second wall section is curved and is at least one of a boot door and a head door.

9. The crop material elevator of claim 8, wherein the second wall section is a boot door positioned at the bottom of the housing of the elevator.

10. The crop material elevator of claim 8, wherein the second wall section is a head door positioned at the top of the elevator.

11. The crop material elevator of claim 8, further comprising a hinge for connecting the second wall section to the first wall section.

12. The crop material elevator of claim 11, wherein the UHMW plastic wear resistant flexible material is secured to the outer sheet adjacent the hinge.

13. The crop material elevator of claim 11, further comprising a removable latch positioned on the second wall section opposite the hinge connection.

14. An agricultural harvester, comprising:
 a chassis;
 at least one ground engaging traction member connected to the chassis;
 a cleaning system held by the chassis and configured to clean crop material; and
 an elevator supplied with the crop material cleaned by the cleaning system, the elevator including:
  a housing comprising a crop material inlet that receives the crop material and a boot portion that forms a bottom of the housing;
  a plurality of paddles configured to convey the crop material through the housing and away from the boot portion in a generally vertical direction;
  a first wall section; and
  a second wall section at least partially overlapping the first wall section, the second wall section comprising:
   an outer sheet of flexible steel secured to the housing of the elevator at least over at least a portion of an edge of the outer sheet; and
   a ultra high molecular weight (UHMW) plastic wear resistant flexible material overlying an inner face of the outer sheet and at least partially overlapping the first wall section and having an area not substantially greater than the area of said outer sheet,
  wherein the second wall section is at least one of a boot door and a head door.

15. The agricultural harvester of claim 14, wherein the elevator further comprises a hinge for connecting the second wall section to the first wall section.

16. The agricultural harvester of claim 15, wherein the UHMW plastic wear resistant flexible material is secured to the outer sheet adjacent the hinge.

17. The agricultural harvester of claim 16, wherein the elevator further comprises a removably secured latch attached to the second wall section opposite to the hinge.

* * * * *